United States Patent [19]

Wang et al.

[11] Patent Number: 5,013,793
[45] Date of Patent: May 7, 1991

[54] DYNAMICALLY CURED THERMOPLASTIC OLEFIN POLYMERS AND PROCESS FOR PRODUCING THE SAME

[75] Inventors: Hsien C. Wang, Edison; Kenneth W. Powers, Berkeley Heights; Robert C. Puydak, Cranbury; Narayanaswami R. Dharmarajan, Highland Park, all of N.J.

[73] Assignee: Exxon Chemical Patents Inc., Linden, N.J.

[21] Appl. No.: 558,698

[22] Filed: Jul. 26, 1990

[51] Int. Cl.$^5$ .................. C08L 23/26; C08L 25/08; C08L 23/18; C08L 23/10
[52] U.S. Cl. .................................. 525/195; 525/240; 525/227; 525/222; 525/221; 525/232; 525/196; 525/192; 525/197; 525/333.4; 524/528
[58] Field of Search ............... 525/240, 195, 221, 222, 525/227

[56] References Cited

U.S. PATENT DOCUMENTS

| | | | |
|---|---|---|---|
| 3,037,954 | 5/1962 | Gessler et al. | 260/29.8 |
| 3,326,833 | 6/1967 | Raley | 260/28.5 |
| 4,130,534 | 12/1978 | Coran et al. | 260/33.6 AQ |
| 4,350,794 | 9/1982 | Moncur | 525/183 |
| 4,593,062 | 6/1986 | Paydak et al. | 524/426 |
| 4,607,074 | 8/1986 | Hazelton et al. | 525/195 |
| 4,639,487 | 1/1987 | Hazelton et al. | 524/24 |

FOREIGN PATENT DOCUMENTS 0344021 11/1989 European Pat. Off. .

Primary Examiner—Carman J. Seccuro
Attorney, Agent, or Firm—Marthe L. Gibbons

[57] ABSTRACT

A dynamically vulcanized thermoplastic composition is provided which comprises a polymer blend of a thermoplastic olefinic resin, and an elastomeric halogen-containing copolymer of a $C_4$ to $C_7$ isomonoolefin and a paraalkylstyrene. A process for preparing the dynamically vulcanized composition is also provided.

34 Claims, No Drawings

DYNAMICALLY CURED THERMOPLASTIC OLEFIN POLYMERS AND PROCESS FOR PRODUCING THE SAME

BACKGROUND OF THE INVENTION

1. Field of the Invention

The invention relates to dynamically vulcanized thermoplastic compositions having improved properties and a process for preparing the compositions.

2. Description of Information Disclosures

In recent years, there has been a significant commercial interest in polymer blends which have a combination of both elastic and thermoplastic properties. These polymer blends have been given the generic designation of Thermoplastic Olefins ("TPO"). They exhibit some of the properties of a cured elastomer as well as the reprocessability of thermoplastic resins. The elastomeric characteristics are enhanced if one component of the blend is a vulcanizable elastomer which is wholly or partially crosslinked.

The earliest work in the curing of TPO compositions was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler's U.S. Pat. No. 3,037,954 discloses compositions comprising polypropylene and a rubber wherein the rubber may be, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. No. 3,326,833 discloses compositions of a copolymer of ethylene with an alkyl ester of an alpha-beta-monoethylenically unsaturated monocarboxylic acid, e.g., ethylene-ethylacrylate copolymer, and a halogenated olefin polymer. The rubber can be halogenated butyl rubber or chlorinated polyethylene. The compositions when uncured are thermoplastic and when peroxide cross-linked form insoluble non-thermoplastic resins.

U.S. Pat. No. 4,639,487 discloses heat shrinkable thermoplastic composition of an ethylene copolymer resin with a dynamically vulcanized halogenated butyl rubber.

Dynamically vulcanized compositions comprising a crystalline thermoplastic olefinic resin and a butyl rubber are known. See, for example U.S. Pat. No. 4,130,534.

U.S. Pat. No. 4,350,794 discloses a polyamide molding and extrusion composition prepared by melt blending a polyamide resin and an elastomer having a polyamide reactive halogen functional group which may be a parahalomethylphenyl group.

There is still a need to improve the properties of dynamically vulcanized compositions.

It has now been found that dynamically vulcanized compositions comprising a thermoplastic olefinic resin and a elastomeric halogen-containing copolymer of an isoolefin and a para-alkylstyrene have improved properties.

SUMMARY OF THE INVENTION

In accordance with the invention, there is provided a thermoplastic composition comprising a dynamically vulcanized polymer blend of a thermoplastic olefinic resin, and an elastomeric halogen-containing copolymer of a $C_4$ to $C_7$ isomonoolefin and a para-alkylstyrene.

DETAILED DESCRIPTION OF THE INVENTION

The thermoplastic composition of the present invention comprises a blend of a thermoplastic olefinic resin, and an elastomeric copolymer of a halogen-containing $C_4$ to $C_7$ isomonoolefin which has been subjected to dynamic vulcanization.

The term "dynamic vulcanization" is used herein to connote a vulcanization process in which the thermoplastic olefinic resin and a vulcanizable elastomer are vulcanized under conditions of high shear. As a result, the vulcanizable elastomer is simultaneously crosslinked and dispersed as fine particles of a "micro gel" within the olefinic resin matrix.

Dynamic vulcanization is effected by mixing the TPO ingredients at a temperature which is at or above the curing temperature of the elastomer in equipment such as roll mills, Banbury ® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

The dynamically vulcanized alloys (DVAs) are generally prepared by blending together the thermoplastic olefinic resin and at least one elastomer with curatives and fillers under conditions of dynamic vulcanization.

In preparing the preferred dynamically vulcanized composition of the present invention, at least a portion of one thermoplastic olefinic resin is blended with an elastomeric halogen-containing copolymer.

The Thermoplastic Olefinic Resin Component

Suitable thermoplastic olefinic resins include high density polyethylene (HDPE), polypropylene, low density polyethylene (LDPE), linear low density polyethylene (LLDPE) very low density polyethylene (VLDPE), ethylene copolymer resins, plastomeric copolymers of ethylene and 1-alkene, polybutylene (PB), and mixtures thereof.

As used herein, the term "polypropylene" includes homopolymers of propylene as well as reactor copolymers of polypropylene (RCPP) which can contain about 1 to about 20 wt. percent ethylene or an alpha olefin comonomer of 4 to 16 carbon atoms. The polypropylene can be highly crystalline isotactic or syndiotactic polypropylene. The RCPP can be either a random or block copolymer. The density of the PP or RCPP can be about 0.80 to about 0.92 g/cc; generally about 0.89 to about 0.91 g/cc.

High density polyethylene (HDPE), useful as the thermoplastic olefinic resin of this invention, generally has a density of about 0.94 to abut 0.97 g/cc. High density polyethylene is an established product of commerce and its manufacture and general properties are well known in the art. Typically, HDPE has a relatively broad molecular weight distribution, characterized by the ratio of weight average molecular weight to number average molecular weight of from about 20 to about 40.

The term "polybutylene" generally refers to thermoplastic resins of both poly(1-butene)homopolymer and the copolymer with, for example, ethylene, propylene, pentene-1, etc. Polybutylene is manufactured via a sterospecific Ziegler-Natta polymerization of monomer(s). Commercially useful products have high molecular weights and isotacticity. A variety of commercial grades of both homopolymer and ethylene copolymer are available with melt indices that range from about 0.3 to about 20 g/10 min.

The term "low density polyethylene" or "LDPE" as used herein mean both low and medium density polyethylene having densities of about 0.91 to abut 0.94 g/cc. The terms include linear polyethylene as well as copolymers of ethylene which are thermoplastic resins.

The term "very low density polyethylene" or "VLDPE" is used herein to mean polyethylene having a density below about 0.91 g/cc and includes linear polyethylene as well as copolymers of ethylene which are thermoplastic resins.

Linear low density polyethylene (LLDPE) is characterized by little, if any, long chain branching, in contrast to conventional LDPE. The processes for producing LLDPE are well known in the art and commercial grades of this thermoplastic olefinic resin are available. Generally, it is produced in gas-phase fluidized bed reactors or liquid-phase solution process reactors; the former process can be carried out at pressures of about 100 to 300 psi and temperatures as low as 100° C.

The term "ethylene copolymer resin" is used herein to denote copolymers of ethylene and vinyl acetate, copolymers of ethylene and an alpha, beta monoethylenically unsaturated monocarboxylic acid, and copolymers of ethylene and an alkyl ester of an alpha, beta monoethylenically unsaturated carboxylic acid. Suitable ethylene copolymer resins include copolymers of ethylene and vinyl acetate or alkyl acrylates, for example, methyl acrylate, ethyl acrylate, butyl acrylate and mixtures thereof. These ethylene copolymer resins may comprise from about 35 to about 98 weight percent ethylene and typically comprise from about 70 to 98 weight percent ethylene, preferably from about 70 to about 95 weight percent ethylene, more preferably from about 72 to about 91 weight percent ethylene. The preferred ethylene copolymer resin for the practice of the present invention is a copolymer of ethylene and vinyl acetate, herein designated "EVA". The ethylene-copolymer resins suitable for use in the practice of this invention include those having a melt index of about 0.2 to about 50 (ASTM D1238 Condition E).

The term "plastomeric copolymer of ethylene and 1-alkene" includes plastomeric copolymers of ethylene with 1-hexene or with 1-butene, respectively, wherein the hexene or butene content of the respective copolymers ranges from about 1 to about 50, preferably from about 10 to about 45, and most preferably from about 15 to about 40 weight percent. The ethylene-hexene or ethylene-butene copolymers suitable for use in the practice of this invention have a melt index (MI) measured by ASTM Standard D1238 Condition E ranging from about 0.3 to about 50, preferably from about 0.5 to about 10. The degree of crystallinity measured as a heat of fusion by DSC of the ethylene-hexene or ethylene-butene copolymer may range from about 5 to about 85 J/g. The preferred ethylene-hexene or ethylene-butene copolymers have a density ranging from about 0.870 to about 0.900.

The Elastomeric Halogen-containing Copolymer Component

Suitable halogen-containing copolymers of a $C_4$ to $C_7$ isomonoolefin and a para-alkylstyrene for use as a component of the composition of the present invention comprise at least about 0.5 weight percent of the para-alkylstyrene moiety. For elastomeric copolymers, products, the para-alkylstyrene moiety may range from about 0.5 weight percent to about 25 weight percent, preferably from about 1 to about 20 weight percent, more preferably from about 2 to about 20 weight percent of the copolymer. The halogen content of the copolymers may range from above zero to about 10 weight percent, preferably from about 0.3 to about 7.0 weight percent. The halogen may be bromine, chlorine, and mixtures thereof. Preferably, the halogen is bromine. The major portion of the halogen is chemically bound to the para-alkyl group, that is, the halogen-containing copolymer comprises para-halo alkyl groups.

The copolymers of the isomonoolefin and para-alkylstyrene useful to prepare the halogen-containing copolymers suitable as the elastomeric component of the composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{M}n$) of at least about 25,000, preferably at least about 50,000, more preferably at least about 100,000. The copolymers also, preferably, have a ratio of weight average molecular weight ($\overline{M}w$) to number average molecular weight ($\overline{M}n$), i.e., $\overline{M}w/\overline{M}n$ of less than about 6, preferably less than about 4, more preferably less than about 2.5, most preferably less than about 2. The brominated copolymer of the isoolefin and para-alkylstyrene obtained by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 wt. percent, and preferably within about 7 wt. percent, of the average para-alkylstyrene content for the overall composition, and preferably at least about 97 wt. percent of the copolymer product has a para-alkylstyrene content within about 10 wt. percent and preferably within about 7 wt. percent, of the average para-alkylstyrene content for the overall composition. This substantially homogeneous compositional uniformity thus particularly relates to the intercompositional distribution. That is, with the specified copolymers, as between any selected molecular weight fraction, the percentage of para-alkylstyrene therein, or the ratio of para-alkylstyrene to isoolefin, will be substantially the same, in the manner set forth above.

In addition, since the relative reactivity of para-alkylstyrene with isoolefin such as isobutylene is close to one, the intercompositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

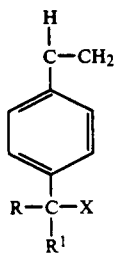

in which R and $R^1$ are independently selected from the group consisting of hydrogen, alkyl preferably having from 1 to 5 carbon atoms, primary haloalkyl, secondary haloalkyl, preferably having from 1 to 5 carbon atoms, and mixtures thereof, and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvent prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40° to about minus 95° C.

The processes for producing the copolymers can be carried out in the form of a slurry of polymer formed in the diluents employed, or as a homogeneous solution process. The use of a slurry process is, however, preferred, since in that case, lower viscosity mixtures are produced in the reactor and slurry concentrations of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in catalyst poisoning or excessive molecular weight depression by complexing with the catalyst or copolymerization with the isomonoolefins or the para-alkylstyrene, which in turn will prevent one from efficiently producing the para-alkylstyrene copolymer product useful in the practice of the present invention. Most particularly, these impurities include the catalyst poisoning materials, such as, for example, moisture and the like, and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.001 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

Suitable solvents for solution halogenation include the low boiling hydrocarbons ($C_4$ to $C_7$) and halogenated hydrocarbons. Since the high boiling point of para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

It should be noted that radical bromination of the enchained para-methylstyryl moiety in the copolymers useful for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable paramethylstyrene/isobutylene copolymers in hydrocarbon solvents such as pentane, hexane or heptane can be selectively brominated using light, heat, or selected radical initiators (according to conditions, i.e., a particular radical initiator must be selected which has an appropriate halflife for the particular temperature conditions being utilized, with generally longer half-lived preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis azo compounds, such as azobis isobutyronitrile (AIBN), azobis (2,4 dimethylvalero) nitrile, azobis (2 methylbutyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as crosslinking. The radical bromination reaction of the copolymers of para-methylstyrene and isobutylene can be highly selective under appropriate conditions and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the paramethylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained paramethylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized paramethylstyrene/isobutylene copolymers can be recovered and finished using conventional means with appropriate stabilizers being added to yield highly desirable and versatile functional saturated copolymers.

In summary, halogenation to produce a copolymer useful as a component of the composition of the present invention is preferably accomplished by halogenating an isobutylene-para-methylstyrene copolymer using bromine in a normal alkane (e.g., hexane or heptane) solution utilizing a bis azo initiator, e.g., AIBN or VAZO ® 52: 2,2'-azobis(2,4-dimethylpentane nitrile), at about 55° to 80° C., for a time period ranging from about 4.5 to about 30 minutes, followed by a caustic quench. The recovered polymer is washed in basic water and water/isopropanol washes, recovered, stabilized and dried.

In the dynamically vulcanized thermoplastic elastomeric composition of the present invention, the thermoplastic olefinic resin may suitably be present in an amount ranging from about 10 to 90 weight percent, preferably from about 15 to 80 weight percent, the elastomeric halogen-containing copolymer of an isoolefin and a para-alkylstyrene may be present in an amount ranging from about 10 to 90 weight percent, preferably from about 20 to 80 weight percent, based on the weight of the polymer blend.

The term "polymer blend" is used herein to denote the blend of one or more thermoplastic olefinic resins, the elastomeric halogen-containing copolymer and any other optional polymers that may be a component of the composition. Optionally, additional elastomers and/or non-elastomeric polymers may be included in the composition of the present invention.

The polymer blend may comprise from about 25 to about 98.wt. percent of the overall DVA composition. In addition to its polymer components, the DVA composition of the present invention may comprise fillers and additives such as antioxidants, stabilizers, rubber processing oils, plasticizers, lubricants (e.g., oleamide), antiblocking agents, waxes, foaming agents, pigments, coupling agents for the fillers and other processing aids known to the rubber compounding art. Metal oxides, e.g., MgO, can be included to act as acid acceptors. The pigments and fillers may comprise up to 40 wt. percent of the total DVA composition based on polymer components plus additives. Preferably, the pigments and fillers comprise about 1 to about 30 wt. percent based on the DVA composition, more preferably about 2 to about 20 weight percent of the overall composition.

Suitable fillers include talc, calcium carbonate, clays, silica or carbon black and mixtures thereof. Any type of carbon black can be used, such as channel blacks, furnace blacks, thermal blacks, acetylene black, lamp black and the like.

In the present invention, although stabilizers are not required because of the inherent stability of the copolymer of the isoolefin and para-alkylstyrene, they can in certain instances be used to further enhance stability. Stabilizers can include ultraviolet stabilizers and the compositions of the present invention are not adversely affected by the addition of stabilizers. Whereas, it has been found that addition of U.V. stabilizers to TPO compositions can significantly decrease the cross-linking performance of curatives utilized for conventional halobutyl elastomer materials. Unexpectedly, such decrease does not occur to the same extent when the curative system is a maleimide curative system. Suitable U.V. stabilizers include hindered amine light stabilizers (HALS) which belong to a class of compounds referred to as hindered amines. These hindered amines have been found to be effective in stabilizing polymers. See for example U.S. Pat. No. 4,064,102 incorporated herein by reference. Commercially available HALS include Tinuvin 770 and Chimassorb 944 LD, which are said to be bis(2,2,6,6-tetramethyl-4-piperidinyl) sebacate and poly((6-((1,1,3,3-tetramethylbutyl)amino-s-Triazine-2-4-diy)((2,2,6,6-tetramethyl-4-piperidyl)imino)h-examethylene((2,2,6,6-tetramethyl-4-piperidyl)imino)), respectively.

Rubber processing oils have particular ASTM designations depending on whether they fall into the class of paraffinic, naphthenic or aromatic hydrocarbonaceous process oils. The type of process oil utilized will be that customarily used in conjunction with a type of elastomer component. The skilled rubber chemist will recognize which type of oil should be utilized with a particular rubber. The quantity of rubber process oil utilized is based on the total rubber content, and can be defined as the ratio, by weight, of process oil to the rubber in the DVA which is to be dynamically vulcanized. This ratio can vary from about 0.3/1 to about 1.3/1; preferably about 0.5/1 to about 1.2/1; more preferably about 0.8/1 to about 1.1/1. Oils other than petroleum based oils such as oils derived from coal tar and pine tar can also be utilized. In addition to or alternatively to the hydrocarbonaceous rubber processing oils, plasticizers such as organic esters and other synthetic plasticizers can be used. As used herein, the term "process oil" means both the petroleum derived process oils and synthetic plasticizer.

The process oil may be included in the DVA to insure that the DVA has good flow properties, e.g., spiral test flow reading of at least 16 cm. The quantity of oil utilized will depend in part on the amount of polymer blend and filler used as well as, to some extent, the type of cure system utilized. The process oil, when included, is present typically in an amount ranging from about 20 to about 35 weight percent of the total composition. Larger amounts of process oil can be used, the deficit being reduced physical strength of the DVA.

Antioxidants may be utilized in the composition of this invention. The particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-di-t-butyl-o-dimethylamino-p-cresol; hydroquinone monobenzyl ether, octylated diphenyl amine, phenyl-beta-naphthlylamine; N,N'-diphenylethylene diamine; aldol-alpha-naphthylamine; N,N'-di-phenyl-p- phenylene diamine, etc. The physical antioxidants include mixed petroleum waxes and microcrystalline waxes. It is within the scope of this invention to incorporate an uncured rubber in the composition. This can be accomplished by selecting as the uncured rubber a rubber which cannot be vulcanized by the vulcanizing agent used to cure the elastomeric halogenated copolymer component of the present invention which is to be dynamically vulcanized or by adding to the dynamically vulcanized thermoplastic composition, after the vulcanization agent has been fully consumed, a rubber which is vulcanizable by the vulcanization agent used to vulcanize the elastomeric halogenated copolymer component of the present invention. For example, when the elastomeric halogenated component of the present invention is vulcanized with a cure system which comprises zinc oxide, any other rubber which requires sulfur or an other curative to vulcanize it or which is not vulcanizable can be included. Such rubbers include ethylene-propylene polymers (EPM) ethylene-propylene-diene polymers (EPDM), polyisobutylene, natural rubber, etc. Alternatively, the DVA can be prepared first from the resin and vulcanizable elastomer by dynamic vulcanization and subsequently, an uncured rubber can be blended into the DVA at a temperature above the melting point of the thermoplastic resin. In the embodiment in which an uncured rubber is incorporated in the dynamically vulcanized composition, the uncured rubber may be present in an amount ranging from above zero to about 25, preferably from about 5 to about 20 weight percent of the total rubber (i.e., elastomer) content of the composition.

Any conventional curative system which is capable of vulcanizing saturated halogenated polymers may be used to vulcanize at least the elastomeric halogenated copolymer of a $C_4$ to $C_7$ isomonoolefin and a para-alkylstyrene, except that peroxide curatives are specifically excluded from the practice of this invention when the thermoplastic resins chosen as polyolefin component are such that peroxide would cause these thermoplastic resins themselves to crosslink. For example, when ethylene-hexene vinyl acetate copolymer or ethylene-hexene polymer is the thermoplastic resin, it would itself vulcanize, thereby resulting in a fully cured non-thermoplastic composition. Suitable curative systems for the elastomeric halogenated copolymer component of the present invention include zinc oxide in combination with zinc stearate or stearic acid and, optionally, one or more of the following accelerators or vulcanizing agents: Permalux—DOTG salt of dicatechol borate, HVA-2—m-phenylene bis maleimide, Zisnet—2,4,6 trimercapto-5-triazine, ZDEDC—zinc diethyl dithiocarbamate—generalized to other dithiocarbamate, Tetrone A—dipentamethylene thiuram hexasulfide, Vultac 5—alkylated phenol disulfide, SP1045—phenol formaldehyde resin, SP1056—brominated alkyl phenol formaldehyde resin, DPPD—diphenyl phenylene diamine, salicylic acid o-hydroxy benzoic acid, wood rosin—abietic acid, and TMTDS in combination with sulfur—tetramethyl thiuram disulfide/sulfur.

The dynamic vulcanization is conducted at conditions to vulcanize at least partially, preferably fully, the elastomeric halogen-containing copolymer.

In the practice of this invention, the thermoplastic olefinic resin, the elastomeric copolymer and optional other polymers, are mixed together at a temperature sufficient to soften the resin or, more commonly, at a temperature above its melting point when the resin is crystalline or semi-crystalline at room temperature, e.g., PP. After the resin and other polymers have been intimately mixed, the curative or curatives are added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin (about 130° C. in the case of HDPE and about 165° C. in the case of PP) to about 250° C.; more typically, the temperature may range from about 150° C. to about 230° C. Preferably the vulcanization is carried out at a temperature range from about 160° C. to about 180° C.

It is preferred that the mixing process be continued until the desired level of vulcanization is completed. If vulcanization is permitted to continue after mixing has stopped, the composition may not be reprocessable as a thermoplastic. However, the dynamic vulcanization can be carried out in stages. For example, vulcanization can be commenced in a twin screw extruder and pellets formed of the DVA material using an underwater pelletizer thereby quenching the vulcanization before it is completed. It can be completed at a later time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative, which may be one or more curatives, to determine the optimum cure system to be utilized and the appropriate cure conditions to achieve a full cure.

While it is preferred that all components be present in the mix prior to carrying out the dynamic vulcanization process of this invention, this is not a necessary condition. For example, in one embodiment, the elastomer to be cured can be dynamically vulcanized in the presence of a portion or all of the thermoplastic olefinic resin. This blend can then be let down into additional thermoplastic olefinic resin. Similarly, it is not necessary to add all of the fillers and oil prior to the dynamic vulcanization. Some or all of the fillers and oil can be added after the vulcanization is completed.

The term "rubber" is used herein interchangeably with "elastomer".

The term "fully vulcanized" as used herein with respect to the dynamically vulcanized rubber components of this invention means that the rubber components to be vulcanized have been cured to a state in which the physical properties of the rubber are developed to impart elastomeric properties to the rubber generally associated with the rubbers in their conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber components of the blends to the extent that they contain no more than about four percent by weight of the cured rubber components extractable at room temperature by a solvent which dissolves the rubbers which are intended to be vulcanized, and preferably to the extent that the composition contains less than two percent by weight extractable. In general, the less extractables of the cured rubber components, the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that of any rubber component of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the crosslink density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation, as shown in *J. Rubber Chem. and Tech.* 30, p. 929. The appropriate Huggins solubility parameters for rubber solvent pairs used in the calculation were obtained from the review article by Sheehan and Bisio, *J. Rubber Chem. & Tech* 39, 149. If the extracted gel content of the vulcanized rubber is low, it is necessary to use the correction of Bueche wherein the term v is multiplied by the gel fraction (%gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

A preferred dynamically vulcanized composition of this invention comprises polypropylene as the thermoplastic olefinic resin, and an elastomeric halogenated copolymer of isobutylene and para- methylstyrene. The preferred halogenated copolymer is a brominated copolymer of isobutylene and para-methylstyrene. Another preferred dynamically vulcanized composition comprises an ethylene copolymer resin selected from the group consisting of a copolymer of ethylene and vinyl acetate, a copolymer of ethylene and an alpha, beta monoethylenically unsaturated monocarboxylic acid, a copolymer of ethylene and an alkyl ester of an alpha beta monoethylenically unsaturated carboxic acid as the thermoplastic olefinic resin, and an elastomeric halogenated copolymer of isobutylene and paramethylstyrene. The preferred halogenated copolymer is a brominated copolymer of isobutylene and para-methylstyrene.

PREFERRED EMBODIMENTS

The following examples are presented to illustrate the invention. All parts and percentages herein are by weight unless specifically stated otherwise.

EXAMPLE 1

Compositions in accordance with the invention and comparative compositions as described in Tables I to IV were mixed in a "B" Banbury mixer utilizing a 10 to 15 minute cycle. The blend compositions were dynamically vulcanized during such cycle by prolonging the mix for about 5 minutes after the addition of curing agents and dumping or discharging at an elevated temperature of about 180° to 200° C.

Table II compares Composition A which comprises a brominated isobutylene para-methylstyrene copolymer, herein designated Copolymer S with a Comparative Composition B which comprises a bromobutyl rubber, herein designated Copolymer P, instead of the brominated isobutylene paramethylstyrene copolymer. Composition A is a composition in accordance with the present invention. Each of the compositions in Example 1 was mixed in a "B" Banbury mixer as follows:

The dynamic vulcanization mix procedure comprises loading the halogenated copolymer resin, MgO, antioxidants, filler, stearic acid into the "B" Banbury and bringing to flux at 160° to 180° C.

After flux, the oil is added in increments.

The curatives were then added and the mixing continued until a peak of power and torque indicated occurring of the reaction. Mixing was continued for 5 minutes while adjusting the rotor speed so as to maintain the batch temperature at 180° C. to 200° C. to complete the cure reaction.

Any remaining oil was added and the batch was dumped from the Banbury.

The abbreviations and/or trademarks for ingredients used in the Tables are shown in Table VI. The test method used to measure the properties shown in the tables are given in Table VII.

As can be seen from the data in Tables III and IV, Compositions D and F, which were compositions in accordance with the present invention, made with the brominated copolymers of isobutylene and para-methyl-styrene, demonstrate that physical properties comparable to those of bromobutyl rubber based comparative Compositions C and E can be obtained at a very low proportion of chemically active curing sites. This shows the high curing efficiency for the elastomeric halogenated component of the present invention. In some cases (Table IV), significant improvements in tear strengths and surface appearance were realized with compositions containing brominated isobutylene-para-alkylstyrene copolymer. The advantages to be expected for the brominated isobutylene para-methylstyrene copolymer compositions are chemical stability and prevention of environmental degradation due to the absence of unsaturation in the polymer backbone and greatly decreased residual reactive sites.

TABLE I

| Composition A | |
|---|---|
| Ingredients | Amounts, wt. % |
| Copolymer S | 20.0 |
| EVA LD 722.62 | 34.0 |
| Circosol 4240 | 15.0 |
| Atomite | 23.8 |
| Titanium Dioxide | 4.3 |
| Irganox 3114 | 0.1 |
| Ultranox 626 | 0.2 |
| Chimassorb 944 | 0.2 |
| Tinuvin 770 | 0.2 |
| Stearic Acid (with polymer) | 0.5 |
| Protox 169, ZnO | 0.8 |
| Stearic Acid (with cure) | 0.1 |
| ZDEDC | 0.4 |
| Zinc Stearate (after cure) | 0.4 |

TABLE II

| PROPERTY COMPARISON | | |
|---|---|---|
| | Composition A[(a)] | Composition B[(b)] |
| Physical Properties | | |
| Hardness, Shore A (5 secs) | 72 | 73 |
| 100% Modulus, psi | 667 | 348 |
| Tensile Strength, psi | 951 | 827 |
| Elongation, % | 276 | 460 |
| Tear (lb/in) Die C | 163 | 143 |
| Compression Set B, % | | |
| 22 hrs @ RT | 24.2 | 19 |
| 22 hrs @ 70° C. | 80.2 | 73 |

[(a)]Formula in Table I
[(b)]Formula in Table I without Copolymer S but with Copolymer P in its place.

TABLE III

| | Composition C | Composition D |
|---|---|---|
| Copolymer P | 20 | — |
| Copolymer T | — | 20 |

TABLE III-continued

|  | Composition C | Composition D |
|---|---|---|
| EMA (Ethylene Methyl Acrylate Copolymer) - Gulf 2205 | 34 | 34 |
| Circosol 4240, Oil | 15 | 15 |
| Atomite | 22.1 | 22.6 |
| Titanium Dioxide | 5 | 5 |
| Maglite D | 0.5 | — |
| Irganox 3114 | 0.1 | 0.1 |
| Chimassorb 944 | 0.2 | 0.2 |
| Tinuvin 770 | 0.2 | 0.2 |
| Stearic Acid (with polymer) | — | 0.5 |
| Curatives | | |
| Protox 169, Zinc Oxide | 2 | 1 |
| Stearic Acid | 0.2 | 0.2 |
| ZDEDC | 0.5 | 0.5 |
| End of Cure Zinc Stearate | — | 0.5 |
| Physical Properties | | |
| Hardness, Shore A (5 sec) | 66 | 68 |
| 100% Modulus, psi | 209 | 189 |
| 300% Modulus, psi | 328 | 324 |
| Tensile Strength, psi | 500 | 503 |
| Elongation, % | 571 | 530 |
| Tear Die B, lb/in | 148 | 170 |
| Tear Die C, lb/in | 167 | 165 |
| Thermal Properties | | |
| Compression Set B, % | | |
| 22 hours @ RT | 29 | 28 |
| 22 hours @ 70° C. | 90 | 81 |
| Flow | | |
| Spiral Flow, cm | 11 | 12 |

TABLE IV

|  | Composition E | Composition F |
|---|---|---|
| Copolymer P | 20 | — |
| Copolymer T | — | 20 |
| (Ethylene Acrylic Acid Methyl Acrylate Terpolymer) SEP, XV 4.04 | 34 | 34 |
| Circosol 4240, Oil | 15 | 15 |
| Atomite | 22.1 | 22.6 |
| Titanium Dioxide | 5 | 5 |
| Maglite D | 0.5 | — |
| Irganox 3114 | 0.1 | 0.1 |
| Chimassorb 944 | 0.2 | 0.2 |
| Tinuvin 770 | 0.2 | 0.2 |
| Stearic Acid (with polymer) | — | 0.5 |
| Curatives | | |
| Protox 169, Zinc Oxide | 2 | 1 |
| Stearic Acid | 0.2 | 0.2 |
| ZDEDC | 0.5 | 0.5 |
| End of Cure Zinc Stearate | — | 0.5 |
| Physical Properties | | |
| Hardness, Shore A (5 sec) | 86 | 86 |
| Tensile Strength, psi | 1515 | 1398 |
| Elongation, % | 237 | 231 |
| Tear Die C, lb/in | 179 | 247 |
| Comments | Poor Surface | Smooth Surface |
| Thermal Properties | | |
| Compression Set B, % | | |
| 22 hours @ RT | 37 | 37 |
| 22 hours @ 70° C. | 76 | 79 |

TABLE V

BROMINATED ISOBUTYLENE-PARA-METHYLSTYRENE COPOLYMERS USED IN THE DYNAMICALLY VULCANIZED COMPOSITIONS

| Polymer | Mole % (a) (b) PMS | Wt. % (c) Bromine | Mole % (a) Brominated PMS | Mv (d) |
|---|---|---|---|---|
| Copolymer S | 2.4 | 1.35 | 0.80 | 1,200,000 |
| Copolymer T | 2.4 | 1.75 | 1.10 | 1,200,000 |
| Copolymer K | 3.6 | 3.75 | 1.10 | 70,000 |
| Copolymer L | 0.2 | 1.35 | 0.17 | 1,200,000 |
| Copolymer M | 2.4 | 4.20 | 2.2 | 1,200,000 |
| Copolymer N | 2.6 | 2.42 | 1.3 | 1,200,000 |
| Copolymer O | 2.4 | 1.45 | 0.8 | 1,200,000 |
| Copolymer W | 2.5 | 2.66 | 1.65 | 600,000 |

Notes
(a) By nuclear magnetic resonance (NMR)
(b) Total para-methylstyrene (PMS) units in polymer, brominated and non-brominated.
(c) Total bromine on polymer by x-ray fluorescence.
(d) Viscosity average MW by dilute solution viscosity (DSV) in diisobutylene at 68° C.

TABLE VI

| Ingredient | Description |
|---|---|
| EVA (LD 722.62) Exxon Chemical Company | Ethylene vinyl acetate copolymer, 20% vinyl acetate, Melt Index 3.0 dg/min (ASTM D1238 Method E) |
| Circosol 4240 Oil Sun Oil Company | Naphthenic oil ASTM D 2226, type 103 |
| ATOMITE Thompson, Weinman & Co. | Natural ground calcium carbonate, mean particle size 3 microns |
| Irganox B-215 Ciba-Geigy | Hindered phenolic antioxidant, thermal stabilizer |
| Ultranox 626 Borg-Warner | Bis(2,4-di-t-butylphenyl) pentaerythritol diphosphite |
| TINUVIN 770 Ciba-Geigy | Bis(2,2,6,6-tetramethyl-4-piperidylsebacate |
| Protox 166 Zinc Corp. of America | American process zinc oxide treated with propionic acid |
| Protox 169 Zinc Corp. of America | French process zinc oxide treated with propionic acid |
| ZDEDC Henley | Zinc diethyl dithiocarbamate |
| Copolymer P | Bromobutyl rubber, 2 wt. % bromine, Mooney Viscosity 46 ± 5, (ML 1 + 8 at 125° C.) |
| Copolymer R | Chlorobutyl rubber, 1.2 wt. % chlorine, Mooney Viscosity 55 ± 5 (ML 1 + 8 at 125° C.) |
| Sunpar 150 oil R. E. Carroll | Paraffinic oil, ASTM D 2226 Type 104B |
| Irganox 1010 Ciba Geigy | Tetrakis (methylene (3,5-di-tert-butyl-4 hydroxy-hydrocinnamate) methane |
| Permalux DuPont Elastomers Chem. Dept. | Di-orthoguanidine salt of dicathechol borate |
| SP 1045 Resin Schenectady Chemicals | Alkylphenol formaldehyde resin |
| Flexon 815 oil Exxon Company, USA | Paraffinic petroleum oil, ASTM Type 104B |
| Omya UFT Omya Co. | Calcium carbonate surface coated |
| Irganox 3114 Ciba-Geigy | Tris(3,5-di-tert-butyl-4-hydroxy benzyl) iso-cyanurate |
| HVA-2 Du Pont | N,N'-m-phenylenedi-maleimide |
| VANOX MTI V. T. Vanderbilt | 2-mercaptotolylimidazole |
| Zisnet F Nippon Zeon Co. Ltd. (dist'r) Sankyo Kasei CO., Ltd. (Manf'r) | 2,4,6-trimercapto-S-triazine |
| EMA Gulf 2205 Chevron Corp. | Ethylene methyl acrylate copolymer, 20 wt. % methyl acrylate, melt index 2.4 |
| Exxon PD 9122 Exxon Chemical Americas | Random reactor polypropylene copolymer having |

TABLE VI-continued

| Ingredient | Description |
|---|---|
| | 2 wt. % ethylene and MFR of 2 |
| Exxon PP 1012 Exxon Chemical Americas | Polypropylene homopolymer density 0.90 g/cm3, MFR 5.0 |
| Chimassorb 944 Ciba Geigy | Poly(6-(1,1,3,3-tetra-metyl-butyl)amino)-5-tri-azine-2,4-diyl)(2,2,6,6-tetramethyl-4-piperidyl) imino)hexamethylene (2,2,6,6-tetramethyl-4-piperidyl)imino) |
| Mistron Cyprubond Talc Cyprus Industrial Minerals | Magnesium silicate, organofunctional surface modified |
| SEP XV 404 Exxon Chemical | Specialty ethylene polymers. Ethylene-methyl acrylate-acrylic acid terpolymers |
| Magnelite D, K C. P. Hall Co. | Magnesium oxide |
| Whitex Clay Freeport Kaolin Co. | Kaolin |
| Exxon PD 7031 Exxon Chemical Americas | Medium impact copolymer propylene, MFR 4.0 |
| Exxon PD 7032 Exxon Chemical Americas | Medium impact copolymer propylene, MFR 4.0 |
| ARCOPRIME 350 Oil Lyondell Petrochemical Co. | Paraffinic food grade white mineral oil, specific gravity 0.863, viscosity 350 Saybolt SUS at 100° F. |
| VISTALON 3777 Exxon Chemical Americas | Oil extended EPDM, 75 parts per 100 parts of rubber, 66% ethylene, Mooney Viscosity 45 (ML 1 + 8 at 127° C.), medium diene, narrow molecular weight distribution |

TABLE VII

| Test | Test Method |
|---|---|
| Hardness, Shore A (5 sec.) | ASTM D2240 |
| 100% Modulus, psi | ASTM D412 |
| 300% Modulus, psi | ASTM D412 |
| Tensile Strength, psi | ASTM D412 |
| Elongation, % | ASTM D412 |
| Tear - Die B (lb/in) | ASTM D-624 |
| Tear - Die C (lb/in) | ASTM D-624 |
| Compression Set B, % | ASTM D395 |
| Mooney Viscosity | ASTM D-3958 |
| Spiral Flow, cm[1] | see footnote |

[1] The spiral flow method is performed by injecting the composition to be tested at a nozzle temperature of 220° C. and a pressure of 800 psi into a spiral mold containing a pathway of semi-circular cross section having a diameter of 0.3 cm, and measuring the length of the portion of the pathway filled by the composition.

TABLE VIII

| Ingredients | G | H | I | J[3] |
|---|---|---|---|---|
| Copolymer R | 34 | — | — | — |
| Copolymer L | — | 34 | — | — |
| Copolymer K | — | — | 41.2 | 31.7 |
| Exxon PP 1012 (5 MFR Polypropylene) | 17 | 17 | 15.9 | 16.8 |
| MgO | 0.2 | 0.2 | 0.2 | 0.2 |
| Atomite | 11.2 | 11.2 | 29.1 | 22.4 |
| Sunpar 150 Oil | 32[1] | 32[2] | 8.4 | 24.9 |
| Irganox 1010 | 0.1 | 0.1 | 0.1 | 0.1 |
| Stearic Acid | 0.5 | 0.5 | 0.5 | 0.4 |
| Protox 166 Zinc Oxide | 4 | 4 | 3.7 | 2.8 |
| Permalux | 1 | 1 | 0.9 | 0.7 |
| Processability Spiral Flow Test, cm at 800 psi | 39.5 | 36 | 13 | 27.5 |
| Physical Properties, Injection Molded | | | | |
| Hardness, Shore A | | | | |
| Instantaneous | 71 | 75 | 86 | 77 |
| 10 Seconds | 67 | 71 | 84 | 74 |
| Tensile Strength, psi | 840 | 900 | 1200 | 650 |
| Elongation, % | 210 | 280 | 70 | 80 |
| Set at Break, % | 19 | 38 | 6 | 3 |
| Tear Strength, Die B, lb/in | 120 | 126 | 120 | 57 |
| Compression Set B 22 hrs. at 100° C., % | 43 | 51 | 43 | 43 |
| Volume Swell 70 hrs at 100° C. in ASTM #3 Oil, % | 82 | 90 | 62 | 40 |

Notes:
[1] 10 parts added after completion of cure
[2] 10 parts added to polymer before start of mix, 10 parts added to mix after completion of cure.
[3] Made by adding additional oil and polypropylene to compound I in a second Banbury mixing operation.

TABLE IX

| Ingredients | Q | V | X | Z |
|---|---|---|---|---|
| Copolymer R | 34.3 | 34 | — | — |
| Copolymer M | — | — | 33 | 32.9 |
| Exxon PP 1012 (5 MFR Polypropylene) | 17.1 | 17 | 17 | 16.5 |
| MgO | — | 0.2 | 0.2 | — |
| Atomite | 10.8 | 11.7 | 12.7 | 12.3 |
| Circosol 4240 Oil | 32.2[1] | — | — | — |
| Sunpar 150 Oil | — | 32 | 32[2] | 32[2] |
| Irganox 1010 | 0.1 | 0.1 | 0.1 | 0.1 |
| Stearic Acid | 0.5 | 0.5 | 0.5 | 0.5 |
| Protox 166 Zinc Oxide | 4 | 4 | 4 | 4.8 |
| Permalux | 1 | — | — | — |
| Zinc Diethyldithio-carbamate (ZDEDC) | — | 0.5 | 0.5 | — |
| SP 1045 Resin | — | — | — | 2.9 |
| Processability Spiral Flow Test, cm at 800 psi | 30.5 | 34 | 23 | 21 |
| Physical Properties, Injection Molded | | | | |
| Hardness, Shore A | | | | |
| Instantaneous | 68 | 60 | 70 | 68 |
| 10 Seconds | 63 | 53 | 68 | 63 |
| Tensile Strength, psi | 720 | 550 | 670 | 710 |
| Elongation, % | 180 | 210 | 90 | 90 |
| Set at Break, % | 16 | 38 | 3 | 3 |
| Tear Strength, Die B, lb/inch | 110 | 100 | 80 | 110 |
| Compression Set B 22 hrs at 100° C., % | 41 | 43 | 34 | 32 |
| Volume Swell 70 hrs at 100° C. ASTM #3 Oil, % | 76 | 149 | 47 | 59 |

Notes:
[1] 10 parts added after completion of cure
[2] 10 parts added to polymer before start of mix, 10 parts added to mix after completion of cure.

TABLE X

| Ingredients | AA | Repeat of AA | BB |
|---|---|---|---|
| Copolymer R | 34 | 34 | — |
| Copolymer N | — | — | 34 |
| Exxon PP 1012 (5 MFR Polypropylene) | 17 | 17 | 17 |
| Maglite K (MgO) | 0.2 | 0.2 | 0.2 |
| Atomite | 11.7 | 11.7 | 11.7 |
| Sunpar 150 Oil | 32[1] | 32[1] | 32[32] |
| Irganox 1010 | 0.1 | 0.2 | 0.1 |

TABLE X-continued

| | Composition | | |
|---|---|---|---|
| Ingredients | AA | Repeat of AA | BB |
| Stearic Acid | 0.5 | 0.5 | 0.5 |
| Protox 166 Zinc Oxide | 4 | 4 | 4 |
| Zinc Diethyl Dithiocarbamate (ZDEDC) | 0.5 | 0.5 | 0.5 |
| Processability Spiral Flow Test, cm at 800 psi | 32 | 34 | 21 |
| Physical Properties, Injection Molded | | | |
| Hardness, Shore A | | | |
| Instantaneous | 63 | 60 | 70 |
| 10 Seconds | 57 | 53 | 67 |
| Tensile Strength, psi | 650 | 690 | 770 |
| Elongation, % | 190 | 210 | 150 |
| Set at Break, % | 25 | 31 | 19 |
| Tear Strength, Die B, lb/inch | 113 | 112 | 85 |
| Compression Set B | 46 | 43 | 35 |
| 2 hrs at 100° C. Volume Swell | | | |
| 70 hrs at 100° C. in ASTM #3 Oil, % | 132 | 129 | 56 |

Notes:
(1) 10 parts added after completion of cure
(2) 10 parts added to polymer before start of mix, 10 parts added to mix after completion of cure.

TABLE XI

| | Composition | | | | | | | |
|---|---|---|---|---|---|---|---|---|
| Ingredients | CC | DD | EE | FF | GG | HH | II | JJ |
| Copolymer P | 34 | — | — | — | — | — | — | — |
| Copolymer O | — | 34 | 34 | 34 | 34 | 34 | 34 | — |
| Copolymer W | — | — | — | — | — | — | — | 34 |
| PD 7031 PP | 17 | 17 | 17 | 17 | 17 | 17 | 17 | 17 |
| Flexon 815 Oil | 35 | 35 | 35 | 35 | 35 | 35 | 35 | 35 |
| Atomite | 7.8 | 7.8 | 11.1 | — | — | — | — | — |
| $TiO_2$ | — | — | — | 10.6 | 11.1 | 11.1 | — | — |
| Omya UFT | — | — | — | — | — | — | 10.6 | 10.6 |
| Maglite D | 0.5 | 0.5 | — | — | — | — | — | — |
| Stearic Acid (added with polymer/fillers) | 0.5 | 0.5 | 0.5 | 0.5 | 0.5 | 0.5 | 0.5 | 0.5 |
| Irganox 3114 | 0.1 | 0.1 | 0.1 | 0.1 | 0.1 | 0.1 | 0.1 | 0.1 |
| Ultranox 626 | 0.2 | 0.2 | 0.2 | 0.2 | 0.2 | 0.2 | 0.2 | 0.2 |
| Chimassorb 944 | 0.2 | 0.2 | 0.2 | 0.2 | 0.2 | 0.2 | 0.2 | 0.2 |
| Tinuvin 770 | 0.2 | 0.2 | 0.2 | 0.2 | 0.2 | 0.2 | 0.2 | 0.2 |
| Curatives | | | | | | | | |
| Protox 169 ZnO | 3.0 | 3.0 | 1.0 | 1.0 | 1.0 | 1.0 | 1.0 | 1.0 |
| Stearic Acid (with curatives) | — | — | 0.2 | 0.2 | 0.2 | 0.2 | 0.2 | 0.2 |
| Vanox MTI | 0.5 | 0.5 | — | — | 0.5 | — | — | — |
| HVA-2 | 1.0 | 1.0 | — | — | — | — | — | — |
| ZDEDC | — | — | 0.5 | 0.5 | — | — | 0.5 | 0.5 |
| Zisnet F | — | — | — | — | — | 0.5 | — | — |
| Zinc Stearate (at end of cure) | — | — | — | 0.5 | — | — | — | — |
| Spiral Flow, cm | 17 | 17.5 | 18 | 20 | 26 | 27 | 20.5 | 21.5 |
| Physical Properties Injection Molded | | | | | | | | |
| Hardness, Shore A (5 secs) | 66/64 | 65 | 61 | 59 | 63 | 63 | 60 | 63 |
| 100% Modulus, psi | 400/390 | 460 | 370 | 330 | 429 | 380 | 330 | 400 |
| MPa | 2.8/2.7 | 3.2 | 2.6 | 2.3 | 2.9 | 2.6 | 2.3 | 2.7 |
| Tensile Strength, psi | 630/590 | 620 | 710 | 770 | 770 | 820 | 740 | 750 |
| MPa | 4.3/4.1 | 4.3 | 4.9 | 5.3 | 5.3 | 5.6 | 5.1 | 5.2 |
| Elongation, % | 210/190 | 180 | 310 | 370 | 250 | 300 | 380 | 240 |
| Tear, Die B, lb/in | 110/70 | 140 | 110 | 110 | 100 | 100 | 110 | 90 |
| KN/m | 19/12 | 24.5 | 20 | 19 | 18 | 18 | 19.8 | 15.1 |
| Tear, Die C, lb/in | 90/89 | 130 | 140 | 140 | 130 | 130 | 130 | 100 |
| KN/m | 16/16 | 22.8 | 24 | 24 | 23 | 23 | 24.5 | 17.9 |
| Compression Set B | | | | | | | | |
| 22 hrs @ RT, % | 12/14 | 14 | 14 | 17 | 16 | 16 | 20 | 13 |
| 22 hrs @ 70, % | 27/29 | 30 | 33 | 28 | 32 | 32 | 33 | 25 |
| 22 hrs @ 100, % | 36/37 | 37 | 35 | 34 | 37 | 39 | 38 | 33 |
| Volume Swell, 70 hrs @ 100° C. | | | | | | | | |
| Distilled Water | —/9 | — | 6 | 6 | 5 | 3 | 6 | 8 |
| ASTM #3 Oil | —/70 | — | 113 | 110 | 85 | 87 | 119 | 75 |
| Heat Aging, 42 Days (1000 hrs) at 150° C. | | | | | | | | |
| Hardness Change, pts | −17 | — | −2 | −1 | +1 | −4 | +1 | +1 |
| Tensile Retention, % | 37 | — | 70 | 66 | 85 | 55 | 71 | 96 |
| Elongation Retention, % | 64 | — | 100 | 79 | 87 | 77 | 97 | 91 |

EXAMPLE 2

Comparative Composition G, and Compositions H, I, and J (see Table VIII), were mixed in a "B" Banbury mixer according to the procedure described in Example 1 except that the dynamically vulcanized compositions were discharged at a temperature 200° C. to 204° C.

Composition G comprises a chlorobutyl rubber (Copolymer R) which contained 1.2 weight percent chlorine and had a Mooney Viscosity (ML 1+8 at 125° C.) of 55±5.

Composition H demonstrates that physical properties comparable to those of the Composition G can be obtained at a very low proportion of chemically active curing sites. The advantages to be realized for Composition H are inherent chemical stability and freedom from environmental degradation due to the absence of unsaturation in the polymer backbone and greatly reduced residual reactive sites.

Compositions I and J were made using a much lower molecular weight halogenated copolymer having a higher proportion of reactive sites for cross-linking. The amount of oil in the formulation had been reduced to accommodate the requirements of a low molecular weight elastomer. Here the curing advantages of the halogenated copolymer are shown in the greatly reduced oil swell relative to the control.

EXAMPLE 3

Table IX shows four compositions mixed in a Haake Rheomix 3000 using a similar mix procedure. Two dynamically vulcanized compositions made with a high molecular weight brominated copolymer at an intermediate level of bromine are compared with controls made using chlorobutylrubber. One comparative composition was cured using a combination of Permalux and zinc oxide, as in Table VIII. The second comparative composition V was cured with a combination of zinc oxide and zinc diethyldithiocarbamate (ZDEDC) which produced a less effective cure in Chlorobutyl, resulting in lower tensile strength and higher oil swell. Two cure systems were used in the brominated copolymer-based dynamic vulcanizates, the zinc oxide/ZDEDC system which was used in the composition V and a zinc oxide/resin system. In both cases the cures achieved with the brominated copolymer of the present invention, namely Compositions X and Z resulted in compression set and oil swell resistance superior to that achieved with either of the Chlorobutyl-based controls.

EXAMPLE 4

Table X shows another comparison between a dynamic vulcanizate Composition BB made with Copolymer N and a control, Composition AA, which was mixed in the Haake Rheomix. Again, the composition in accordance with the invention, namely, Composition BB has better resistance to compression set and oil swell than Chlorobutyl-based DVA controls.

EXAMPLE 5

A series of dynamically vulcanized compositions utilizing brominated copolymers of isobutylene and paramethylstyrene were prepared according to the procedure described in Example 1. The formulation and test results of these dynamically vulcanized compositions (DVAs) are shown in Table XI.

The results indicate that physical properties and compression set resistance and heat aging Compositions DD, EE, FF GG, HH, II, and JJ, which were compositions in accordance with the present invention, were equal to or slightly better than those made with bromobutyl rubber, namely Composition CC. The optimized curative levels are lower with the brominated copolymer of isobutylene and paramethylstyrene than with bromobutyl rubber. The ZDEDC, HVA-2 and Zisnet F (2,4,6 trimercapto-5-triazine; curative for epichlorohydrin, polyacrylate and polychloroprene) were effective accelerators for zinc oxide cures and appeared to permit white color. The bromine level and molecular weight of the brominated isobutylene-para-methyl styrene copolymer can be selected to balance compression set, elongation, oil swell and water absorption.

EXAMPLE 6

Another series of dynamically vulcanized compositions were prepared according to the procedure described in Example 1.

The formulations and test results of these DVA compositions are shown in Tables XII to XXIII and the properties are compared with DVA compositions which contained a halogenated elastomeric copolymer other than halogenated copolymers of isobutylene and para-methyl styrene.

Copolymer S, which was brominated copolymer of isobutylene and para-methylstyrene used in the compositions in accordance with the present invention is described in Table V.

TABLE XII

| Composition KK | |
|---|---|
| Ingredients. | Amounts, Wt. % |
| Copolymer S | 16.0 |
| High Melt Strength Polypropylene (melt flow rate 2) | 16.0 |
| Vistalon 3777 | 47.8 |
| Flexon 815, Oil | 11.0 |
| Talc, Mistron Cyprubond | 4.9 |
| Titanium Dioxide | 2.3 |
| Irganox 3114 | 0.14 |
| Ultranox 626 | 0.28 |
| Chimassorb 944 | 0.08 |
| Tinuvin 770 | 0.08 |
| Stearic Acid (with polymer) | 0.19 |
| Protox 169, ZnO | 0.54 |
| Stearic Acid (with cure) | 0.15 |
| ZDEDC | 0.28 |
| Zinc Stearate (after cure) | 0.25 |

TABLE XIII

| | Property Comparison | | |
|---|---|---|---|
| | | Compositions | |
| Physical Properties | KK | LL[a] | MM[b] |
| Hardness, Shore A (5 secs) | 73 | 80 | 71 |
| 100% Modulus, psi | 524 | 543 | 450 |
| Tensile Strength, psi | 747 | 950 | 870 |
| Elongation, % | 544 | 558 | 400 |
| Tear (lb/in) Die C | 320 | 322 | 201 |
| Compression Set, % | | | |
| 22 hrs @ RT | 27.2 | — | 30 |
| 22 hrs @ 70° C. | 57.6 | 63 | 57 |
| Flow Spiral, cm | 9 | 18 | 13 |

Notes:
[a]90/10 melt mix of Composition KK and Fina Z 9470 X (random PP coppolymer, 6% C2 content [approximately], 5 MFR).
[b]Formula in Table XII without Copolymer S but with Copolymer R in its place.

TABLE XIV

| Ingredients | Composition NN Amount Wt. % |
|---|---|
| Copolymer S | 24.0 |
| High Melt Strength Polypropylene (melt flow rate 2) | 24.0 |
| Vistalon 3777 | 32.8 |
| Flexon 815, Oil | 8.0 |

TABLE XIV-continued

| Ingredients | Composition NN Amount Wt. % |
|---|---|
| Talc, Mistron Cyprubond | 7.3 |
| Titanium Dioxide | 1.9 |
| Irganox 3114 | 0.16 |
| Ultranox 626 | 0.32 |
| Chimassorb 944 | 0.12 |
| Tinuvin 770 | 0.12 |
| Stearic Acid (with polymer) | 0.29 |
| Protox 169, Zno | 0.81 |
| Stearic Acid (with cure) | 0.23 |
| ZDEDC | 0.40 |
| Zinc Stearate (after cure) | 0.35 |

TABLE XV

Property Comparison

| | Composition | | |
|---|---|---|---|
| | NN | OO | PP |
| Physical Properties | | | |
| Hardness, Shore A (5 secs) | 85 | 81 | 85 |
| 100% Modulus, psi | 910 | 609 | 769 |
| Tensile Strength, psi | 1044 | 996 | 1247 |
| Elongation, % | 394 | 510 | 310 |
| Tear (lb/in) Die C | 435 | 292 | 257 |
| Compression Set. | | | |
| 22 hrs @ RT | 37.9 | — | 36 |
| 22 hrs @ 70° C. | 56.4 | 61 | 58 |
| Flow Spiral, cm | 8 | 16 | — |

Notes:
(a) 90/10 melt mix of Composition NN and Flexon 815 oil.
(b) Similar to Composition NN formula of Table IX but with Copolymer S and with Copolymer R crosslinked with an appropriate cure system in its place

TABLE XVI

| Ingredients | Amount, Wt. % |
|---|---|
| Copolymer S | 42.0 |
| Polypropylene PD 7132 | 16.0 |
| Flexon 815, Oil | 32.0 |
| Atomite | 3.6 |
| Titanium Dioxide | 2.5 |
| Irganox 3114 | 0.1 |
| Ultranox 626 | 0.2 |
| Chimassorb 944 | 0.2 |
| Tinuvin 770 | 0.2 |
| Stearic Acid (with polymer) | 0.5 |
| Protox 169, ZnO | 1.2 |
| Stearic Acid (with cure) | 0.3 |
| ZDEDC | 0.6 |
| Zinc Stearate (after cure) | 0.6 |

TABLE XVII

| | QQ | RR[a] | SS[b] |
|---|---|---|---|
| Physical Properties | | | |
| Hardness, Shore A (5 secs) | 69 | 75 | 66 |
| 100% Modulus, psi | 398 | 496 | 330 |
| Tensile Strength, psi | 735 | 780 | 754 |
| Elongation, % | 314 | 297 | 310 |
| Flex Modulus, psi | 5378 | — | 2380 |
| Tear (lb/in) Die C | 263 | 271 | 98 |
| Compression Set | | | |
| 22 hrs @ RT | 13.9 | — | 22 |
| 22 hrs @ 70° C. | 32.4 | 48 | 36 |
| Flow | 12 | 18 | 16 |

TABLE XVII-continued

| | QQ | RR[a] | SS[b] |
|---|---|---|---|
| Spiral, cm | | | |

Notes:
(a) 90/10 melt mix of Composition QQ and Fina Z 9470 X.
(b) Similar to the formula of Composition QQ except Copolymer R and an appropriate cure system was used instead of Copolymer S.

TABLE XVIII

| Ingredients | Composition TT Amount, Wt. % |
|---|---|
| Copolymer S | 31.0 |
| Polypropylene, PD7132 | 22.0 |
| Flexon 815, Oil | 30.0 |
| Titanium Dioxide | 13.6 |
| Irganox 3114 | 0.1 |
| Ultranox 626 | 0.2 |
| Chimassorb 944 | 0.2 |
| Tinuvin 770 | 0.2 |
| Stearic Acid (with polymer) | 0.5 |
| Protox 169, ZnO | 1.0 |
| Stearic Acid (with cure) | 0.2 |
| ZDEDC | 0.5 |
| Zinc Stearate (after cure) | 0.5 |

TABLE XIX

Property Comparison

| | Composition | | |
|---|---|---|---|
| | TT | VV[a] | VV |
| Physical Properties | | | |
| Hardness, Shore A (5 secs) | 80 | 76 | 75 |
| 100% Modulus, psi | 363 | 457 | 595 |
| Tensile Strength, psi | 735 | 807 | 1015 |
| Elongation, % | 350 | 363 | 220 |
| Tear (lb/in) Die C | 351 | 299 | 254 |
| Compression Set. % | | | |
| 22 hrs @ RT | 21.6 | — | 24 |
| 22 hrs @ 70° C. | 43.4 | 49 | 36 |
| Flow Spiral, cm | 11 | 21 | 18 |

Notes:
(a) 95/5 melt mix of Composition TT and Flexon 815 oil.
(b) Same as Composition TT except that Copolymer P and an appropriate cure system was used instead of Copolymer S.

TABLE XX

| Ingredients | Composition WW Amount Wt. % |
|---|---|
| Copolymer S | 44.0 |
| Polypropylene, PD9122 | 15.0 |
| Arco Prime 350, Oil | 24.0 |
| Whitex Clay | 8.5 |
| Titanium Dioxide | 4.6 |
| Irganox 3114 | 0.1 |
| Ultranox 626 | 0.2 |
| Chimassorb 944 | 0.2 |
| Tinuvin 770 | 0.2 |
| Stearic Acid (with polymer) | 0.5 |
| Protox 169, Zno | 1.2 |
| Stearic Acid (with cure) | 0.3 |
| ZDEDC | 0.6 |
| Zinc Stearate (after cure) | 0.6 |

TABLE XXI

| | Composition | |
|---|---|---|
| Physical Properties | WW | XX[a] |
| Hardness, Shore A (5 secs) | 64 | 55 |
| 100% Modulus, psi | 350 | 218 |
| Tensile Strength, psi | 683 | 508 |

TABLE XXI-continued

| Physical Properties | Composition WW | XX[a] |
|---|---|---|
| Elongation, % | 279 | 325 |
| Flex Modulus, psi | 3174 | — |
| Tear (lb/in), | | |
| Die B | 113 | 86 |
| Die C | 172 | 116 |
| Compression Set, % | | |
| 22 hrs @ RT | 10.1 | 22 |
| 22 hrs @ 70° C. | 27.8 | 35 |
| Flow | 10.0 | 17.5 |
| Spiral, cm | | |

Note:
[a]Similar to the Composition WW except that Copolymer R with an appropriate cure system was used in place of Copolymer S.

TABLE XXII

| Ingredients | Composition YY Amount, wt. % |
|---|---|
| Copolymer S | 40.0 |
| Polypropylene, PD9122 | 19.0 |
| Arco Prime-350, Oil | 25.0 |
| Whitex Clay | 7.5 |
| Titanium Dioxide | 4.6 |
| Irganox 3114 | 0.1 |
| Ultranox 626 | 0.2 |
| Chimassorb 944 | 0.2 |
| Tinuvin 770 | 0.2 |
| Stearic Acid (with polymer) | 0.5 |
| Protox 169, ZnO | 1.2 |
| Stearic Acid (with cure) | 0.3 |
| ZDEDC | 0.6 |
| Zinc Stearate (after cure) | 0.6 |

TABLE XXIII

| | Composition YY | ZZ[a] |
|---|---|---|
| Physical Properties | | |
| Hardness, Shore A (5 secs) | 74 | 65 |
| 100% Modulus, psi | 458 | 310 |
| Tensile Strength psi | 800 | 629 |
| Elongation, % | 295 | 328 |
| Flex Modulus, psi | 4061 | — |
| Tear (lb/in), Die C | 220 | 125 |
| Compression Set, % | | |
| 22 hrs @ RT | — | 27 |
| 22 hrs @ 70° C. | — | 44 |
| Flow Spiral, cm | 10.0 | — |

[a]Same as Composition YY except that Copolymer R with an appropriate cure system was used in place of Copolymer S.

The physical properties of the compositions comprising the halogenated copolymer of isobutylene and paramethylstyrene, which were compositions in accordance with the present invention, were compared with comparative compositions. The results were as follows: Tear strengths were higher in the brominated IB-PMS copolymer compositions of the present invention than those of the comparative compositions; 100% modulus was higher in compositions of the present invention than in the comparative compositions; spiral flow was lower than control in comparative compositions; tensile strength and elongations were comparable to comparative compositions (in some cases, enhancement was achieved); resistance to compression set was comparable to comparative compositions (in a few cases, even better resistance to compression set was noticed); and flow properties can be improved to match known compositions by melt mixing with either oil or random polypropylene copolymer.

What is claimed is:

1. A thermoplastic composition comprising a dynamically vulcanized polymer blend of a thermoplastic olefinic resin, and an elastomeric halogen-containing copolymer of a $C_4$ to $C_7$ isomonoolefin and a paraalkylstyrene.

2. The thermoplastic composition of claim 1, wherein said thermoplastic olefinic resin is present in an amount ranging from about 10 to 90 weight percent, and said elastomeric halogen-containing copolymer is present in an amount ranging from about 10 to 90 weight percent, based on said polymer blend.

3. The thermoplastic composition of claim 1, wherein said thermoplastic olefinic resin is present in an amount ranging from about 15 to 80 weight percent, said elastomeric halogen-containing copolymer is present in an amount ranging from about 20 to 80 weight percent, based on said polymer blend.

4. The thermoplastic composition of claim 1, wherein said elastomeric halogen-containing copolymer is present in said composition as particles dispersed in said thermoplastic olefinic resin.

5. The thermoplastic composition of claim 1, wherein said elastomeric halogen-containing copolymer is at least partially vulcanized.

6. The thermoplastic composition of claim 1, wherein said elastomeric halogen-containing copolymer is fully vulcanized.

7. The thermoplastic composition of claim 1, wherein said thermoplastic olefinic resin is selected from the group consisting of high density polyethylene, polypropylene, low density polyethylene, linear low density polyethylene, very low density polyethylene, ethylene copolymer resins, plastomeric copolymers of ethylene and 1-alkene, polybutylene, and mixtures thereof.

8. The thermoplastic composition of claim 1, wherein said thermoplastic olefinic resin is selected from the group consisting of polyethylene, polypropylene and mixtures thereof.

9. The thermoplastic composition of claim 1, wherein said thermoplastic olefinic resin is an ethylene copolymer resin selected from the group consisting of a copolymer of ethylene and vinyl acetate, a copolymer of ethylene and an alpha, beta monoethylenically unsaturated monocarboxylic acid, a copolymer of ethylene and an alkyl ester of an alpha, beta monoethylenically unsaturated carboxylic acid and mixtures thereof.

10. The thermoplastic composition of claim 9, wherein said ethylene copolymer resin is a copolymer of ethylene and vinyl acetate.

11. The thermoplastic composition of claim 9, wherein said ethylene copolymer resin is a copolymer of ethylene and an alkyl acrylate selected from the group consisting of methyl acrylate, ethyl acrylate, butyl acrylate, and mixtures thereof.

12. The thermoplastic composition of claim 1, wherein said elastomeric halogen-containing copolymer comprises from about 0.5 to about 25 weight percent of said para-alkylstyrene.

13. The thermoplastic composition of claim 1, wherein said elastomeric halogen-containing copolymer comprises from above zero to about 10 weight percent of said halogen.

14. The thermoplastic composition of claim 1, wherein said halogen is selected from the group consisting of chlorine, bromine, and mixtures thereof.

15. The thermoplastic composition of claim 1, wherein said halogen comprises bromine, and wherein said bromine is chemically bound to said para-alkylstyrene.

16. The thermoplastic composition of claim 1, wherein said isomonoolefin is isobutylene and said para-alkylstyrene is para-methylstyrene.

17. The thermoplastic composition of claim 1, additionally comprising an uncured rubber.

18. The thermoplastic composition of claim 1, additionally comprising a component selected from the group consisting of a filler, a rubber compounding additive, and mixtures thereof.

19. The thermoplastic composition of claim 1, additionally comprising an additive selected from the group consisting of rubber processing oils, plasticizers and mixtures thereof.

20. A process for preparing a vulcanized thermoplastic composition, which comprises the steps of:
(a) blending a thermoplastic olefinic resin, an unvulcanized elastomeric halogen-containing copolymer of a $C_4$ to $C_7$ isomonoolefin and a para-alkylstyrene, and a vulcanization agent capable of vulcanizing said elastomeric halogen-containing copolymer; and
(b) masticating and shearing the blend resulting from step (a) at vulcanization conditions for a time sufficient to produce a vulcanized thermoplastic composition.

21. The process of claim 20, wherein an additional rubber which is not vulcanizable by said vulcanizing agent is added before said step (b) or after said step (b).

22. The process of claim 20, wherein an additional rubber which is curable by said vulcanizing agent is added to said vulcanized thermoplastic composition after said vulcanizing agent has been fully consumed.

23. The process of claim 20, wherein said vulcanized thermoplastic composition comprises crosslinked discrete particles of said elastomeric halogen-containing copolymer dispersed in said thermoplastic olefinic resin.

24. The process of claim 20, wherein said vulcanization conditions include a temperature ranging from about the melting point of said thermoplastic olefinic resin to about 250° C.

25. The process of claim 20, wherein said thermoplastic olefinic resin is selected from the group consisting of high density polyethylene, low density polypropylene, very low density polyethylene, ethylene copolymer resins, plastomeric copolymers of ethylene and 1-alkene, polybutylene, and mixtures thereof.

26. The process of claim 20, wherein said thermoplastic olefinic resin is an ethylene copolymer resin selected from the group consisting of a copolymer of ethylene and vinyl acetate, a copolymer of ethylene and an alpha, beta monoethylenically unsaturated monocarboxylic acid, a copolymer of ethylene and an alkyl ester of an alpha, beta monoethylenically unsaturated carboxylic acid and mixtures thereof.

27. The process of claim 26, wherein said ethylene copolymer resin is a copolymer of ethylene and vinyl acetate.

28. The process of claim 26, wherein said ethylene copolymer resin is a copolymer of ethylene and an alkyl acrylate selected from the group consisting of methyl acrylate, ethyl acrylate, butyl acrylate, and mixtures thereof.

29. The process of claim 20, wherein said elastomeric halogen-containing copolymer comprises from about 0.5 to about 25 weight percent of said paraalkylstyrene.

30. The process of claim 20, wherein said elastomeric halogen-containing copolymer comprises from above zero to about 10 weight percent of said halogen.

31. The process of claim 20, wherein said halogen is selected from the group consisting of chlorine, bromine, and mixtures thereof.

32. The process of claim 20, wherein said halogen comprises bromine and wherein said bromine is chemically bound to said para-alkylstyrene.

33. The process of claim 20, wherein said isomonoolefin is isobutylene and said para-alkylstyrene is para-methylstyrene.

34. The process of claim 20, wherein said vulcanized thermoplastic composition comprises from about 10 to about 90 weight percent of said thermoplastic olefinic resin, and from about 10 to about 90 weight percent of said elastomeric halogen-containing copolymer, based on the weight of said thermoplastic olefinic resin plus said elastomeric halogen-containing copolymer.

* * * * *